UNITED STATES PATENT OFFICE.

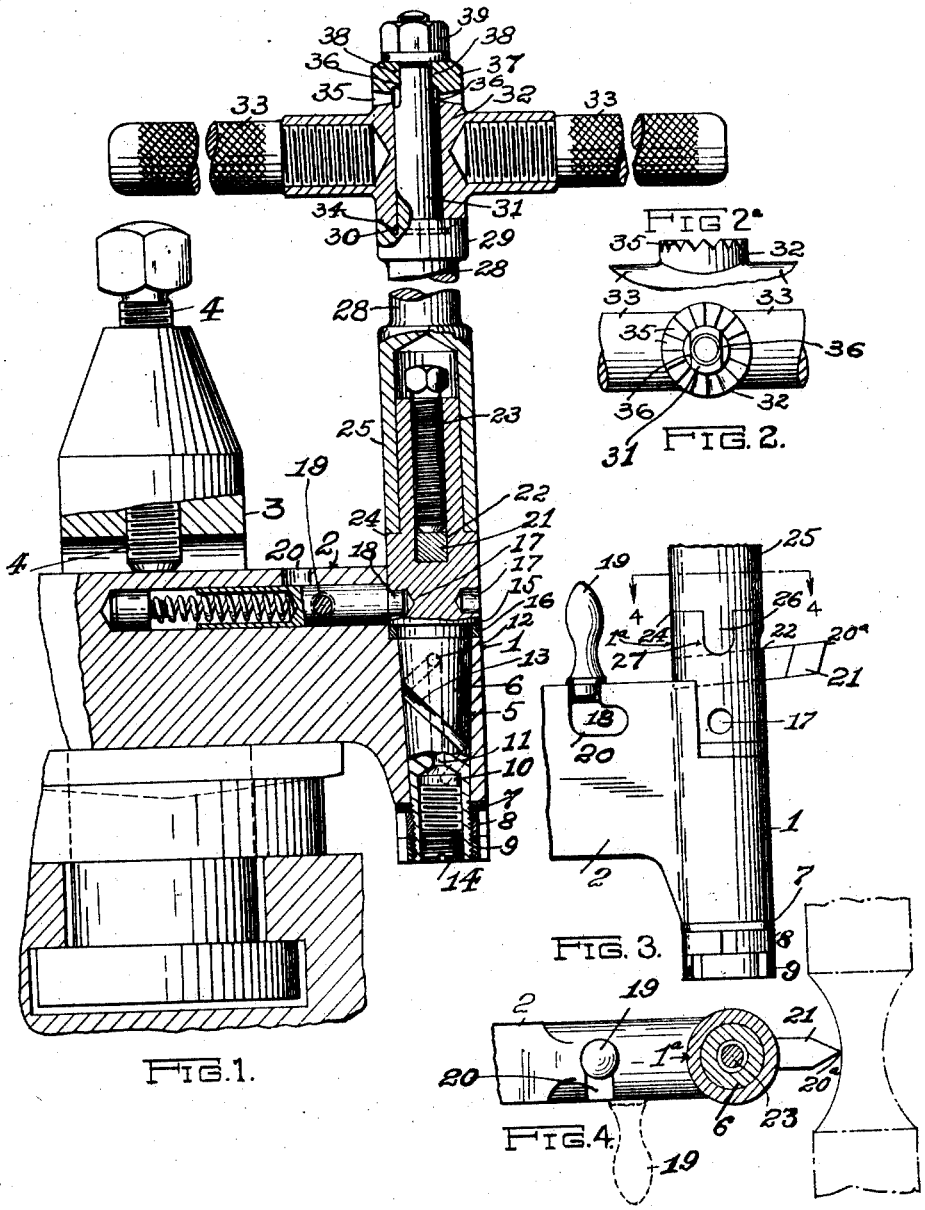

ANDREY SHEBERASHENKO, OF DETROIT, MICHIGAN.

RADIUS TOOL.

1,415,903.          Specification of Letters Patent.    Patented May 16, 1922.

Application filed September 3, 1921. Serial No. 498,436.

*To all whom it may concern:*

Be it known that I, ANDREY SHEBERASHENKO, citizen of Russia, residing at Detroit, county of Wayne, State of Michigan, have invented a certain new and useful Improvement in Radius Tools, and declare the following to be a full, clear, and exact description of the same, such as will enable others skilled in the art to which it pertains to make and use the same, reference being had to the accompanying drawings, which form a part of this specification.

My invention relates to a radius tool shown in the accompanying drawings and more particularly set forth in the following specification and claims.

The object of my invention is to provide a device adapted to be supported in a suitable tool post in which the cutting tool may be adjusted to cut radial peripheral grooves of varying width, the construction being such that a micrometer may be readily applied, whereby the proper adjustment of the cutting tool may be obtained to secure grooves of any desired size.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the accompanying drawings,

Figure 1 is a vertical cross-sectional view with parts broken away showing the tool supported in a lathe tool post of usual construction.

Figure 2 is a fragmentary plan view of the manually operated handle for rotating the tool when cutting the groove; showing the flattened shank of its rotatable spindle extending through a bore in the ratchet-faced top of the handle, a co-operating ratchet collar and nut for securing the handle rigidly to the shank—shown in Figure 1—being removed.

Figure 2ª is a fragmentary side elevation of that portion of the handle shown in Figure 2.

Figure 3 is a fragmentary elevation of the tool holder, showing in released position the handle of a manually operated spring actuated bolt for holding the rotatable spindle of the device in fixed relation to its laterally extending supporting shank mounted in the tool post.

Figure 4 is a fragmentary plan view, partly in section, taken on or about line 4—4 of Figure 3, and showing in dotted lines a peripheral groove cut in a cylinder by the tool;—the figure also showing in dotted lines the handle for operating the spring bolt in its lowered or engaged position.

Referring now to the letters of reference placed upon the drawings:

The tool stock 1 is provided with a laterally projecting shank 2 supported in a tool post 3 by a set screw 4. The stock 1 is provided with a tapering bore 5 into which is fitted a tapering spindle 6 threaded at its lower end to receive a washer 7 and nut 8 and lock nut 9. 10 denotes a relatively large central bore in the spindle in which is lodged grease or other lubricant, a bore 11 opening into the enlarged bore 10 extends upwardly in the spindle and is connected by a transverse hole 12 with a peripheral groove 13 on the outside of the tapering end of the spindle 6. A screw plug 14 is fitted into the lower end of the spindle which when adjusted serves to force the lubricant from the central bore into the peripheral groove to lubricate the spindle. The spindle 6, above its tapering end is formed with a shoulder 15, between which and the shoulder formed by the tool stock 1, is a collar 16. Extending into the spindle are diametrically opposed recesses 17—17 adapted to receive the end of a spring actuated bolt 18 lodged in a bore in the shank 2 of the tool stock to secure the spindle against rotation. A handle 19 for manually operating the bolt extends through a bayonet slot 20, in the wall of the shank that the bolt may be secured in its released position when desired. A cutting tool 21 extends at a slight angle through a transverse opening 22 in the spindle and is secured in position by a set screw 23 extending downwardly through a central tapped bore in the spindle. The upper end of the spindle is relatively smaller in diameter than the portion through which the cutting tool extends forming a shoulder 24;—and fitted to the upper end and against the shoulder is a socket member 25 provided with one or more downwardly extending lugs 26 which project into recesses 27 formed in the wall of the spindle. The socket member 25 is also provided with an upwardly extending shank 28 enlarged at 29 to provide a socket 30 having a chamfered edge surrounding the upstanding stem 31 of the shank. On this stem is fitted the hub 32 of the laterally extending handles 33—33 for manually rotating the spindle. The lower face of the hub is beveled (see 34) to fit the inclined walls of the socket and the upper face of the hub is formed with ratchet teeth 35 surrounding the bore through which the stem 31—flattened as at 36 near its end—(see Figure 2) extends. A collar 37 provided with ratchet teeth adapted to engage the ratchet teeth of the hub of the handle is provided with a central opening having opposing flattened faces 38 adapted to register with the flattened sides 36 of the stem whereby the operating handle may be secured in fixed relation thereto. A nut 39 screwed upon the end of the stem 31 serves to maintain the teeth of the collar in interlocked relation with the teeth of the hub of the operating handle, it being apparent that the handle may first be adjusted upon the shank to accommodate the work and then secured to the shank by the nut that the operator may swing the cutting tool from side to side as the cutting of the groove progresses in the cylinder.

In order that the tool may be adjusted to cut a predetermined radii—say for example a radii of two inches—the micrometer is adjusted to extend from the cutting end 20ª of the cutting tool to a point 1ª at the back of the tool stock, (see Figure 4) the micrometer reading being two inches plus the radii of the tool stock. The cutting tool is then secured in the rotatable spindle against displacement by means of the set screw 23,—the spindle being being held against rotation by the spring actuated bolt 18 while the set screw 23 is adjusted. In order that the handle 33—33 for manually rotating the spindle may be positioned upon the spindle for the convenient operation of the cutting tool, the nut 39 securing the ratchet faced collar in locked relation with the ratchet faced hub is first released, the collar is then lifted out of engagement with the ratchet teeth of the hub of the handle which may then be turned upon the stem to a convenient position for operating the cutting tool;— the collar is then again engaged with the ratchet face of the hub and the nut 39 adjusted to hold the collar in interlocking relation therewith.

Having thus described my invention what I claim is:

1. In a tool of the character described, a stock or member provided with a shank adapted to be supported in a tool post and with a tapering bore to receive a rotatable spindle, a spindle fitted to the bore of said stock and provided with a lateral opening to receive a cutting tool, a cutting tool mounted in said opening, a set screw adapted to secure the tool in the spindle, means adapted to engage the spindle to secure it against rotation in the stock, a socket member adapted to engage said spindle having a projecting shank, manually operated means loosely sleeved upon the shank of said socket member, and means for securing said handle rigidly to the shank of the socket member when the handle is adjusted.

2. In a tool of the character described, a stock provided with a tapering bore and an integral shank adapted to support the stock in a tool post, a rotatable spindle having a tapering end fitted to the bore of the stock, a spring actuated bolt housed in the shank of the stock adapted to engage the spindle to secure it against rotation, means for maintaining said bolt in released relation to the spindle, a cutting tool supported in a transverse bore in the spindle, means for securing the cutting tool in said spindle, a socket member detachably engaged to the spindle having a projecting shank, a rotatably adjustable handle loosely fitted to the shank and means for locking said handle to the shank of the socket member, whereby the latter, together with the spindle and cutting tool may be manually rotated.

3. In a tool of the character described; a stock provided with a tapering bore adapted to be supported in a tool post; a rotatable spindle having a tapering end fitted to the bore of the stock, said spindle provided with a central bore to receive a lubricant and a peripheral groove connected by a transverse hole to the central bore; a plug screwed into said central bore, whereby the lubricant may be forced into the peripheral groove of the spindle; a cutting tool supported in a transverse opening in the spindle; means for securing the cutting tool in the spindle and manually operated means for rotating the spindle.

4. In a tool of the character described; a stock provided with a tapering bore adapted to be supported in a tool post; a rotatable spindle having a tapering end fitted to the bore of the stock; nuts threaded to the end of said spindle to secure it against accidental detachment from the stock; means for securing said spindle against rotation in said stock, said means being adapted to be held in released relation to the spindle, whereby the latter may be rotated; a cutting tool extending transversely through the spindle; a set screw for securing the cutting tool in the spindle; a socket member adapted to receive the end of the spindle and provided with projecting lugs extending into recesses in the spindle, whereby the socket member and spindle may rotate as a unit; said spindle being also provided with a projecting shank; a handle adapted for manually rotating said spindle loosely sleeved on said shank and means for locking said handle to the said shank, whereby the spindle may be rotated.

5. In a tool of the character described, a stock having a tapering bore; a rotatable spindle having a tapering end fitted to the bore of the stock; nuts threaded to the end of said spindle to connect the spindle and stock together as a unit, said spindle provided with a transverse opening to receive a cutting tool; means for securing the tool in the spindle; a socket member adapted to engage the spindle whereby the spindle and socket member may be rotated as a unit, said socket member provided with an upstanding shank to receive the hub of an operating handle; an operating handle loosely fitted to said shank having a hub provided with ratchet teeth; a ratchet tooth collar rotatable with the shank and longitudinally slidable thereon to engage the teeth on the hub of the operating handle; and a nut threaded on the end of the shank adapted to force said collar with its ratchet teeth into interlocking relation with the ratchet teeth of the operating handle, whereby the cutting tool may be manually rotated.

In testimony whereof I sign this specification in the presence of two witnesses.

ANDREY SHEBERASHENKO.

Witnesses:
S. E. THOMAS,
MAURICE WOLF.